(12) United States Patent
Crompton et al.

(10) Patent No.: US 9,068,680 B1
(45) Date of Patent: Jun. 30, 2015

(54) PUSH-TO-CONNECT FITTING INTEGRATED PACKING ARRANGEMENT, DEVICE AND METHODS

(71) Applicant: Quick Fitting, Inc., Warwick, RI (US)

(72) Inventors: David B. Crompton, Tiverton, RI (US); Libardo Ochoa Dias, Pawtucket, RI (US)

(73) Assignee: Quick Fitting, Inc., Warwick, RI (US)

( * ) Notice: Subject to any disclaimer, the term of this patent is extended or adjusted under 35 U.S.C. 154(b) by 0 days.

(21) Appl. No.: 14/291,509

(22) Filed: May 30, 2014

(51) Int. Cl.
*F16L 37/091* (2006.01)
*F16L 37/098* (2006.01)

(52) U.S. Cl.
CPC ............ *F16L 37/091* (2013.01); *F16L 37/0982* (2013.01)

(58) Field of Classification Search
CPC ......... F16L 19/08; F16L 19/10; F16L 37/091; F16L 37/0982
USPC .................................................. 285/39, 340
See application file for complete search history.

(56) References Cited

U.S. PATENT DOCUMENTS

| | | | | |
|---|---|---|---|---|
| 6,343,814 | B1* | 2/2002 | Bucher et al. | 285/319 |
| 6,612,623 | B2* | 9/2003 | Salomon-Bahls | 285/308 |
| 7,445,247 | B2* | 11/2008 | Ericksen et al. | 285/39 |
| 8,322,755 | B2* | 12/2012 | Kluss et al. | 285/340 |
| 2009/0278347 | A1* | 11/2009 | Kerin et al. | 285/39 |

FOREIGN PATENT DOCUMENTS

WO    WO 0194798 A1 * 12/2001

* cited by examiner

*Primary Examiner* — James Hewitt
(74) *Attorney, Agent, or Firm* — Williams Mullen PC; Thomas F. Bergert

(57) ABSTRACT

A push fitting joint packaging arrangement includes embodiments with a pusher locking member having at least one nipple member extending radially into a locking member opening, and a release pusher having a wing extending radially outwardly around the circumference of an inner wall, wherein the inner wall includes at least one access channel and at least one stop channel, wherein the at least one access channel and the at least one stop channel are engageable with the at least one nipple member of the pusher locking member. A push fitting joint packaging arrangement includes separate embodiments with a tamper-resistant release pusher configuration, employing a retaining clip that is slidably engageable with a pusher locking member, and wherein a release pusher is removably or releasably securable to the pusher locking member.

24 Claims, 14 Drawing Sheets

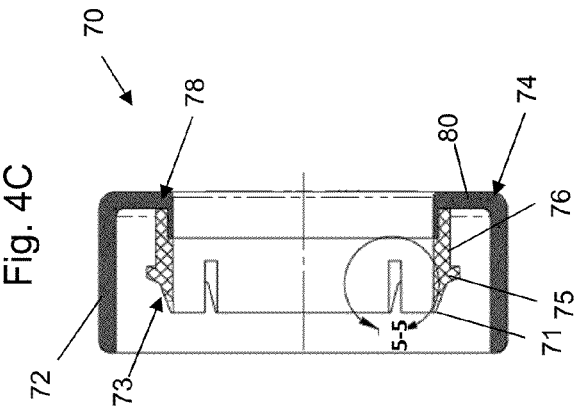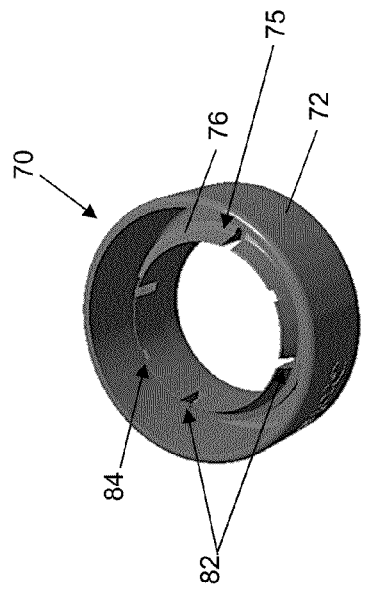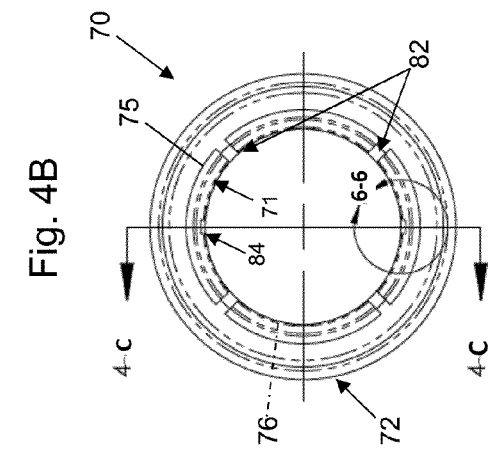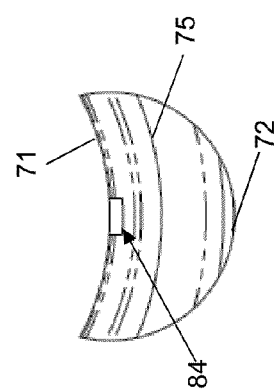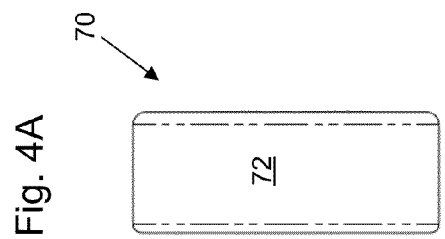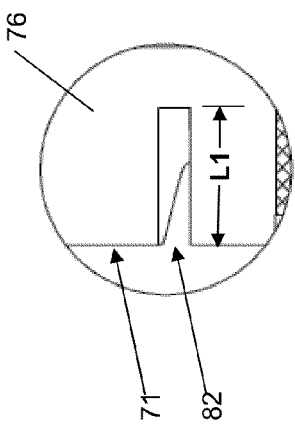

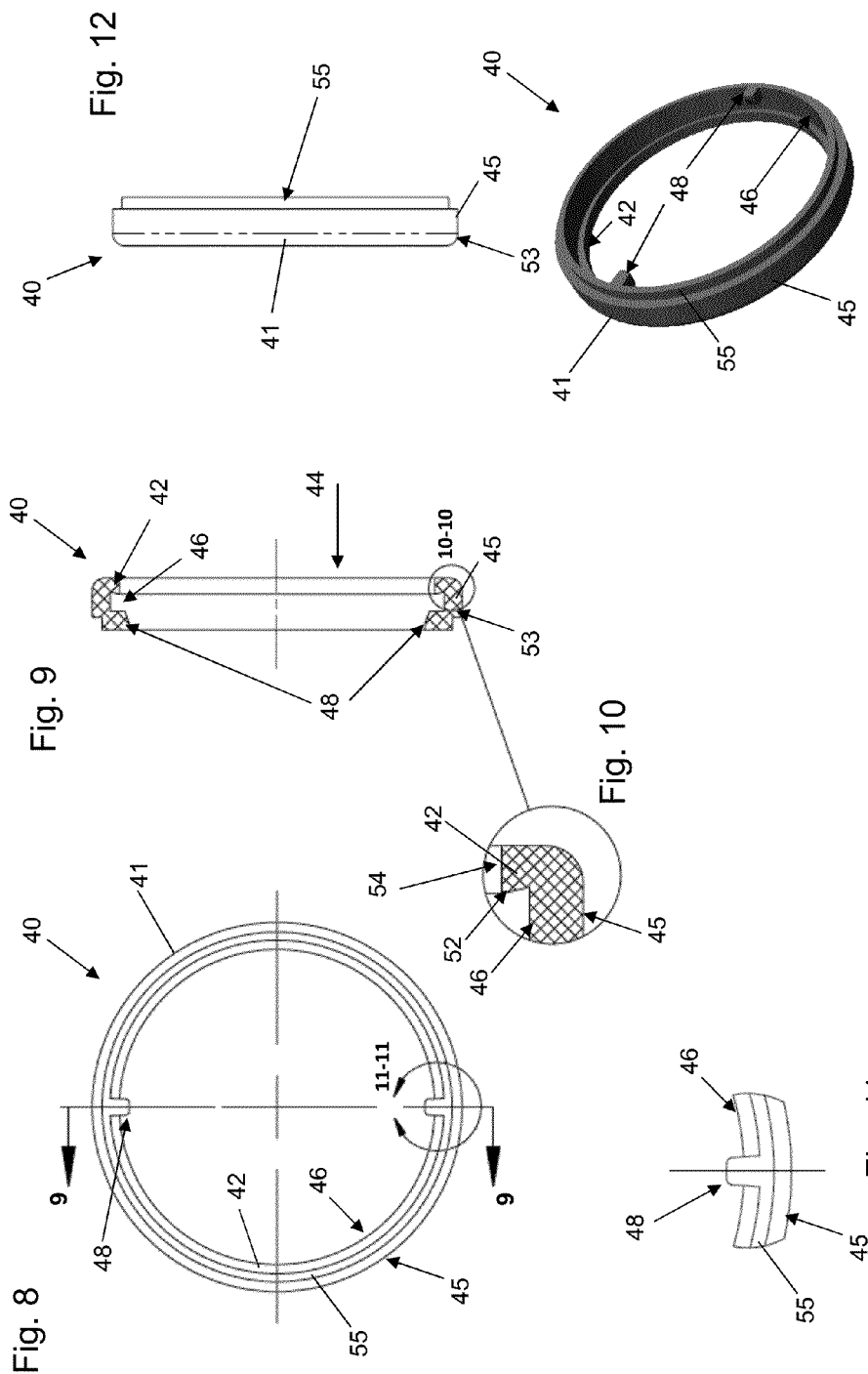

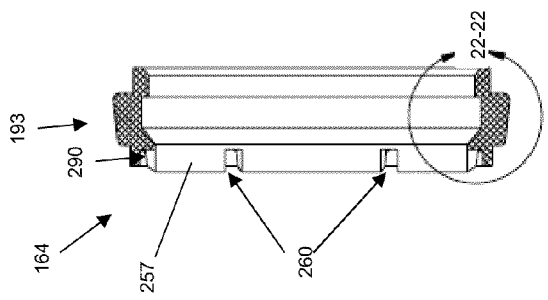
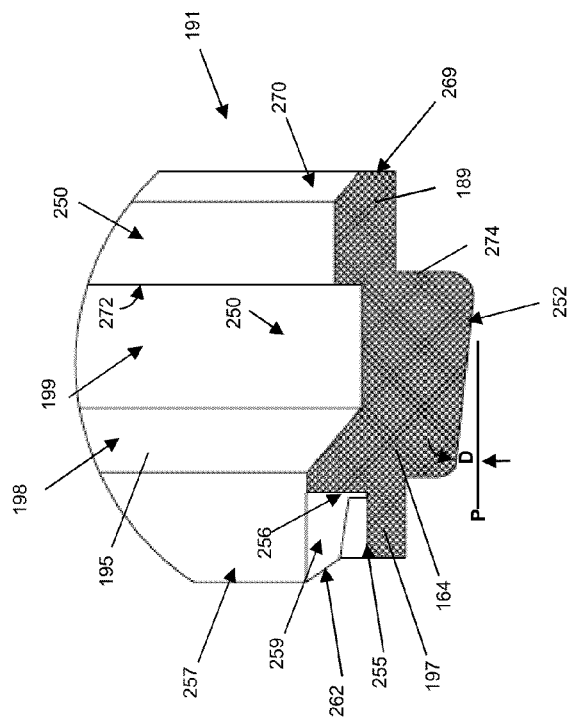
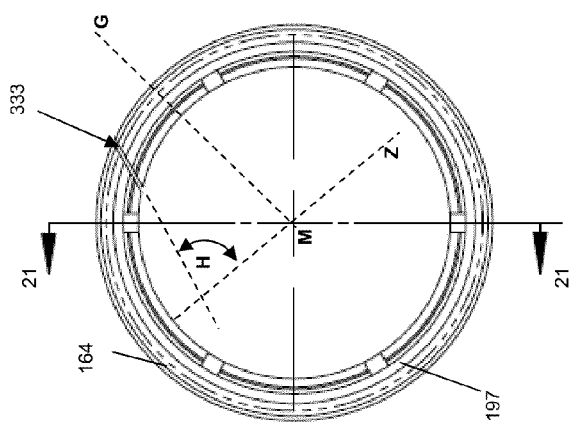

PUSH-TO-CONNECT FITTING INTEGRATED PACKING ARRANGEMENT, DEVICE AND METHODS

FIELD OF THE INVENTION

The present invention relates to fluid flow systems, and more particularly to a push-fit packing arrangement, device and methods that facilitate simple insertion and removal of piping and tubing system parts within a fitting.

BACKGROUND OF THE PRESENT INVENTION

Piping systems exist to facilitate the flow of fluids (e.g., liquid, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing and piping types can include, for example, copper, stainless steel, CPVC (chlorinated polyvinyl chloride) and PEX (cross-linked polyethylene). For purposes of the present disclosure, the term "tube", "pipe", "piping" or "piping element" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In recent years, push-fit technology has been employed with piping systems to reduce the dangers and time involved in soldering joints. Push-fit methods require minimal knowledge of pipe fittings and involve far fewer materials than soldering. For example, one may only need the pipes, quick-connect fittings, a chamfer/de-burring tool and tubing cutter in order to connect pipes using push-fit technology.

The steps involved in connecting piping systems using push-fit technology can be outlined as follows. First, the pipe is cut to the appropriate length and the end of the pipe is cleaned with the de-burring tool. Then the pipe and fitting are pushed together for connection. The fitting is provided with a fastening ring (also called a collet, grip ring or grab ring) having teeth that grip the pipe as it is inserted. The fastening ring device is employed to provide opposing energy, preventing the device from disconnection while creating a positive seal.

Accordingly, no wrenches, clamping, gluing or soldering is involved. Push-fit and/or quick-connect technology for piping systems can be obtained, for example, through Quick Fitting, Inc. of East Providence, R.I., USA, suppliers of the CoPro® line of push fittings and related products. Also, such technology is described, for example, in U.S. Pat. Nos. 7,862,089, 8,205,915, 8,210,576, 8,398,122, and 8,480,134, the disclosures of which are incorporated herein by reference in their entireties.

In past pipe coupling technology, the fastening ring is inserted into the fitting body along with a plastic grip ring support that typically fails under extensive tensile testing. Further, the coupling must then be either coin rolled, glued or receive a threaded cap member to retain the fastening ring inside the fitting body. In addition to the added steps for the manufacture and assembly of the coupling, the strength of the plumbing joint is determined by the retaining cap member. The additional steps and components add significant labor and manufacturing costs to the final product cost and reduce the overall production capability due to the extensive time required for proper assembly.

In addition to the above, when using a threaded retaining cap method, the process of cutting threads into the fitting body and the retaining cap elevates the cost of machining the fitting components. Further, the threaded end cap method requires mechanical assembly as well as the added cost and application of a thread sealant to the threads. In prior efforts that employ a coined retaining cap method, the process of coining the fitting body as the retaining cap significantly increases the cost of final assembly of the fitting. Additionally, the coining process permanently encapsulates the fastening ring inside the fitting, whereby the fastening ring cannot be removed without complete destruction of the ring and fitting.

Along with additional assembly steps and increased manufacturing costs, past pipe fittings and connection methods do not allow repair for various reasons. In some cases, this is because they are factory sealed, for example. In other cases, it is because the separation of the fitting from the pipe can damage or induce wear on the parts. For example, some push-to-connect fittings provide permanently fixed demounting rings for removing the fittings. The demounting rings can be depressed axially to lift the fastening ring teeth off of the surface of the inserted pipe, such that the pipe can then be withdrawn. This arrangement, however, can subject the fittings to tampering and shorter life. In addition, while fastening ring devices work effectively as an opposing retaining member, their functionality makes them nearly impossible to dismount, remove or detach for re-use. The fastening rings are thus permanently affixed unless they are cut and removed, which then destroys the fastening ring.

Whether connected by traditional soldering methods or with push-fit methods, practical applications invariably require the replacement of fittings and valves, and do not allow re-use of the fittings or valves in instances where only a small internal component needs to be repaired or replaced.

SUMMARY OF THE PRESENT INVENTION

The present invention provides, in part, a push fitting assembly package that facilitates the re-use of push fittings without damage to the fitting elements or the pipe. The present invention connects piping using no tools, clamps, solder or glues, while creating a leak-free seal at the connected joining area. Further, unlike prior methods, the present invention provides an integrated release pusher and locking mechanism that allows for quick locking and unlocking of piping elements within a fitting. In embodiments of the present invention, the packing arrangement can be installed within a fitting device without coining, threading or gluing.

The quick connection pipe joint assembly package provided as part of embodiments of the present invention employs a lockable release pusher that, when in the unlocked position, permits the pusher to move axially inwardly of the fitting, lifting teeth of a fastening ring and thereby facilitating the insertion and release of a cylindrical object such as a piping element held within the fitting. The release pusher can be adapted to be permanently secured to a fitting, yet in a way whereby the pusher can move axially and rotationally. The release pusher can be provided with outer and inner cylindrical portions, with the inner portion having axially extending slots. A locking member can also be provided, comprising a substantially ring-shaped body having a radially outer surface and a radially inner surface, with at least one nipple member extending radially into an opening from the radially inner surface. In one embodiment of the present invention, the pusher has multiple slots and the pusher locking member has multiple nipple members, the axially extending slots of the release pusher are of different lengths, and the longer slots are adaptable to fit over the nipple members and the shorter slots are adaptable to lockingly engage the nipple members to retain the release pusher in at least a temporarily fixed relation to the locking member. When the longer axial slots are aligned with the nipple members, axially applied pressure to the release pusher can move the longer slots of the release pusher over the nipple members. This assists in allowing a pipe to be inserted in the fitting, as axially applied pressure to the release pusher causes the inner cylindrical portion of the pusher to flex teeth of a fastening ring to create an opening for the pipe. Once the pipe is fully inserted, the axially applied pressure on the release pusher can be reduced, thereby releasing the pressure on the fastening ring and allowing the fastening ring teeth to securely engage the pipe and retain it in place. Further, the release pusher can be rotated to align the nipple members with a corresponding shorter slot such that the pusher is locked and/or fixed in relation to the locking member. When locked, axially applied pressure on the release pusher will not permit the pusher to engage the fastening ring teeth. However, the pusher can be rotated so as to align the longer slots with the nipple members, and thereby allow the release pusher to engage and flex the fastening ring teeth.

When a piping element is desired to be removed, axially applied pressure can be provided again to the release pusher when the release pusher longer slots are aligned with the nipple members of the pusher locking member, lifting the fastening ring teeth off of the inserted pipe to allow it to be removed. In one embodiment of the present invention, the release pusher is permanently secured to the fitting and is part of the packing arrangement.

For purposes of the present disclosure, a fitting (also referred to as a body member) can encompass a valve member and other piping elements including, but not limited to: a coupling joint, an elbow joint, a tee joint, a stop end, a ball valve member, tubing and other objects having cylindrical openings. In one embodiment of the present invention, one or more sealing member gasket inserts (e.g., O-ring members) fit within a sealing compartment defined in the interior of the fitting. A sealing ring stabilizer element can also be provided to provide support for the one or more sealing rings. In addition, at each pipe receiving end of the fitting, a locking compartment is machined into the interior wall of the fitting to receive a snap ring member and a locking pusher member and to assist in retaining the edges of the fastening ring. The interior compartments and housing elements provide integrated support for the sealing members and fastening ring when opposing force is applied to piping elements that have been inserted into the fitting. In one embodiment of the present invention, the snap ring member is a flexible metal member positioned axially inwardly of the fastening ring within the fitting.

One aspect of the present invention provides a novel push fitting joint packaging arrangement comprising a release pusher and a locking member. The packing arrangement can further provide a snap ring for secure retention of the base portion of a fastening ring within a locking compartment of a fitting, for example. In one embodiment, the snap ring cooperates with the locking member to securely retain the fastening ring base portion. The packing arrangement can further include one or more sealing members and a sealing member stabilizer ring. A method in accordance with the present invention can comprise inserting the locking member into a locking compartment of a fitting, and inserting a portion of the release pusher into the locking compartment and fixedly yet movably engaging the release pusher with the locking member. Another method in accordance with the present invention can comprise providing a fitting and an integrated packing arrangement for securing the release pusher to the locking member within the locking compartment of the fitting. A device of the present invention can comprise a fitting having a locking compartment, with a locking member maintained within the locking compartment and a release pusher adapted to fixedly yet movably engage the locking member. In embodiments of the present invention, a portion of the release pusher is maintained within the fitting and a portion is maintained outside of the fitting.

In other embodiments of the joint assembly of the present invention, a fitting has an interior wall, an exterior wall and end walls, and a spacer gland member, one or more sealing members, a retaining ring member, a pusher locking member and a fastening ring are inserted into the interior of the fitting. A release pusher is also provided that can engage the pusher locking member, whereby the release pusher is partially extendable into the interior of the fitting. The fastening ring, sealing members, spacer gland member, retaining ring, pusher locking member and release pusher together, and in subset combinations, provide embodiments of a packing arrangement 165 for the present invention. Further, one or more of the fastening ring, spacer gland member, retaining ring and pusher locking member can be split in order to facilitate insertion into and removal from the interior of the fitting. In such embodiments, the release pusher is releasably secured to the pusher locking member, and the retaining clip is provided with axially inwardly facing shoe extensions that can support the fastening ring teeth. In embodiments, the shoe extensions are formed with gaps therebetween and/or thereunder to facilitate flexible operation in supporting the fastening ring teeth, for example. In embodiments, the release pusher is provided with a ridge that can snap into a slot of the pusher locking member, enabling a user to apply axial pressure to the release pusher to push a tip portion of the pusher locking member into teeth of the fastening ring. Once the teeth are extended, a piping element can be inserted and/or removed.

Other methods, devices and arrangements as described herein are provided by the present invention.

BRIEF DESCRIPTION OF THE DRAWINGS

FIG. 4A is a front view of one embodiment of the release pusher of the present invention.

FIG. 4B is a left side view of the release pusher of FIG. 4A.

FIG. 4C is a front cross-sectional view of the release pusher taken along line 4C-4C of FIG. 4B.

FIG. 5 is an enlarged view of encircled portion 5-5 of FIG. 4C.

FIG. 6 is an enlarged view of encircled portion 6-6 of FIG. 4B.

FIG. 7 is a perspective view of one embodiment of the release pusher of the present invention.

FIG. 8 is a front view of the pusher locking member in accordance with one embodiment of the present invention.

FIG. 9 is a right side cross-sectional view of the release pusher taken along line 9-9 of FIG. 8.

FIG. 10 is an enlarged view of encircled portion 10-10 of FIG. 9.

FIG. 11 is an enlarged view of encircled portion 11-11 of FIG. 8.

FIG. 12 is a left side view of the pusher locking member of FIG. 8.

FIG. 13 is a perspective view of one embodiment of the pusher locking member of the present invention.

FIG. 20 is a front view of one embodiment of the retaining clip element of the present invention.

FIG. 21 is a right side cross-sectional view of the embodiment of the retaining clip element taken along the line 21-21 of FIG. 20.

FIG. 22 is an enlarged view of the portion of the retaining clip element shown in encircled portion 22-22 of FIG. 21.

DETAILED DESCRIPTION OF THE PREFERRED EMBODIMENTS

Figure 1:
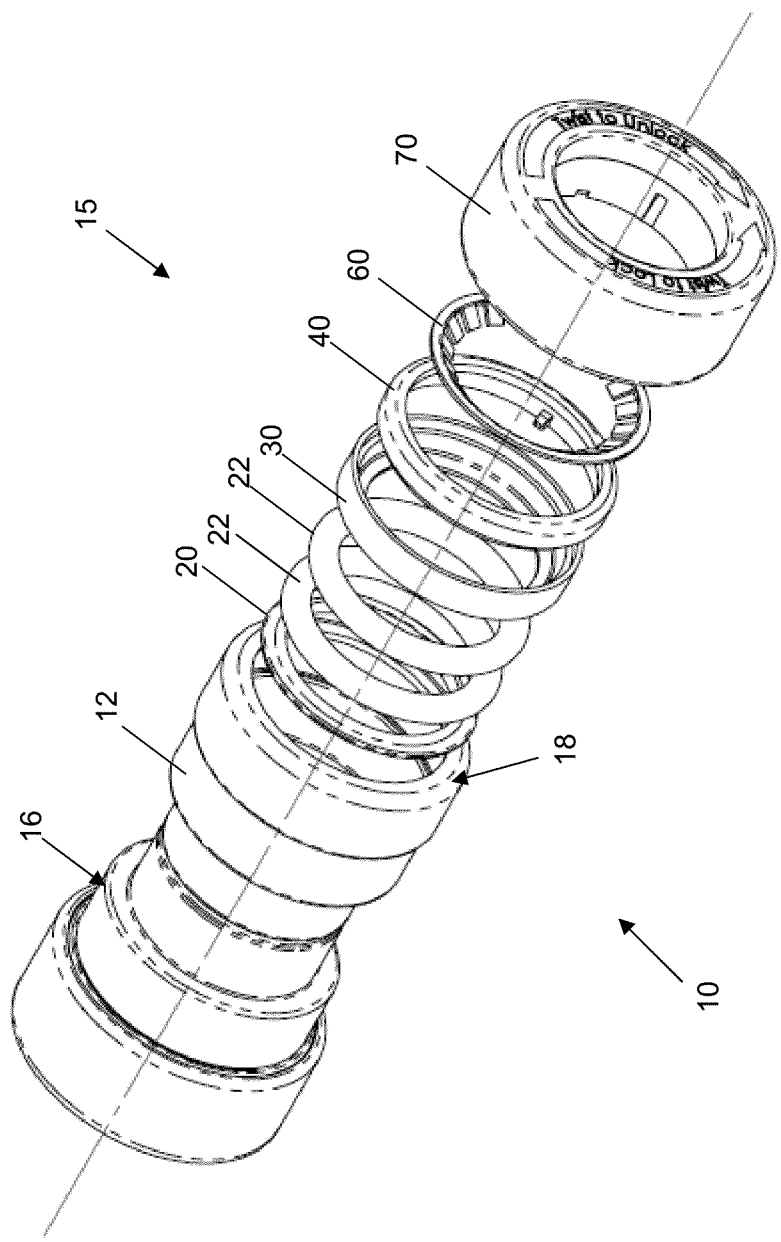
FIG. 1 is an exploded front perspective view of one embodiment of a piping joint assembly package in accordance with embodiments of the present invention.

In the push-fit piping joint assembly 10 of one embodiment of the present invention as shown in FIGS. 1 through 13, elements of the joint assembly as shown include: a fitting (i.e., fitting body member) 12 having an interior wall 14, an exterior wall 16, end walls 18, a sealing ring stabilizer/support member 20, one or more sealing members 22 (which can be optionally lubricated), a snap ring member 30, a pusher locking member 40, a fastening ring 60 and a release pusher 70. The fastening ring 60, sealing members 22, sealing ring support member 20, snap ring 30, pusher locking member 40 and release pusher 70 together, and in subset combinations, provide embodiments of a packing arrangement 15 for the present invention, and each has a substantially ring-shaped body forming an opening extending axially therethrough, such as along axis A, for example. The axial opening allows for smooth and snug engagement of a piping or tubing element external surface (not shown). The interior wall 14 of fitting 12 defines a pipe receiving cavity 17 extending axially through the fitting. In one embodiment, the interior diameters of the fastening ring 60 (as measured to the teeth 62 and not the ring cylindrical base 64) and sealing members 22 are substantially the same, and the interior diameters of the fitting 12 and the release pusher 70 are substantially the same. Further, the interior diameters of the fastening ring 60 and sealing members 22 can be slightly less than that of the fitting 12 and release pusher 70 so as to facilitate proper operation of the present invention. The release pusher 70 is substantially cylindrical and includes an external tip 71 for engaging teeth of a fastening ring as described in more detail elsewhere herein.

In one embodiment, the fitting 12 can be forged CW617N brass, with full porting and full flow fitting, for example. In another embodiment, the fitting 12 can be a plastic material. The lubricant for the sealing members 14, 16 can be a food grade lubricant, for example. It will be appreciated that the sealing members 22 can comprise a flat ring or washer-type seal member in addition or as an alternative to a circular member of substantially circular cross-section. The sealing ring support member 20 can be inserted axially inwardly of the sealing ring(s) and assists in keeping the sealing rings from being pulled axially inwardly of the fitting when a tube element is inserted in the fitting. The fastening ring 60 can comprise a spring steel formulation, for example, that enables the fastening ring to be malformed during installation, while springing back into its originally manufactured position once installed. The fastening ring is capable of grabbing an inserted pipe's surface via two or more teeth 62 to ensure connections cannot be pulled apart. The fastening ring teeth are angled downward from the substantially cylindrical perimeter of the ring, toward the fitting and away from the release pusher, such that when the pipe is inserted, the teeth exert a pressure against the pipe to discourage the pipe from slipping or moving back out of the fitting. No wrenches, solder, welding, glue and/or twisting and turning the elements are required to form a connection.

Figure 2:
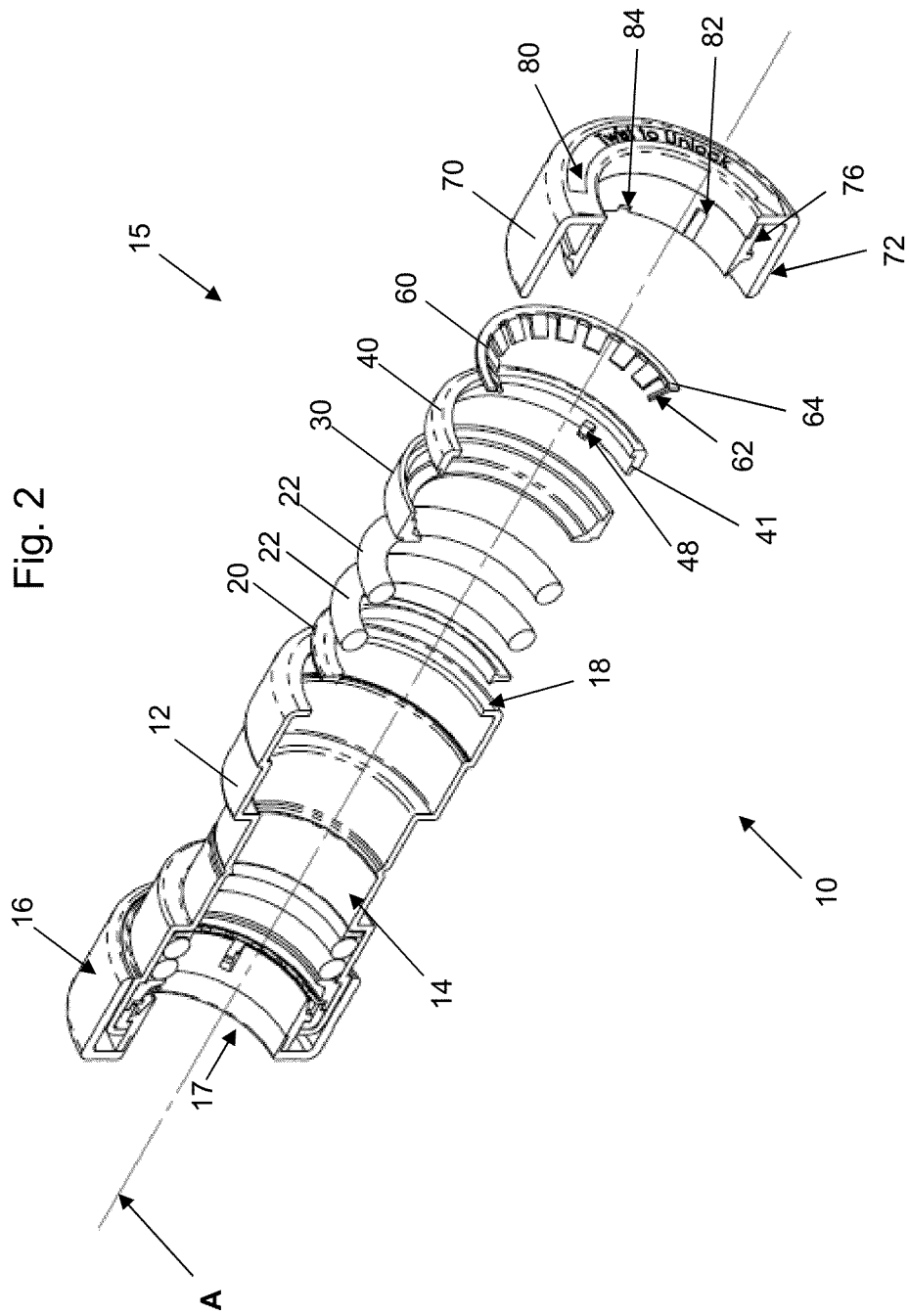
FIG. 2 is a partially exploded front perspective cross-sectional view of the piping joint assembly package of FIG. 1.
Figure 3:
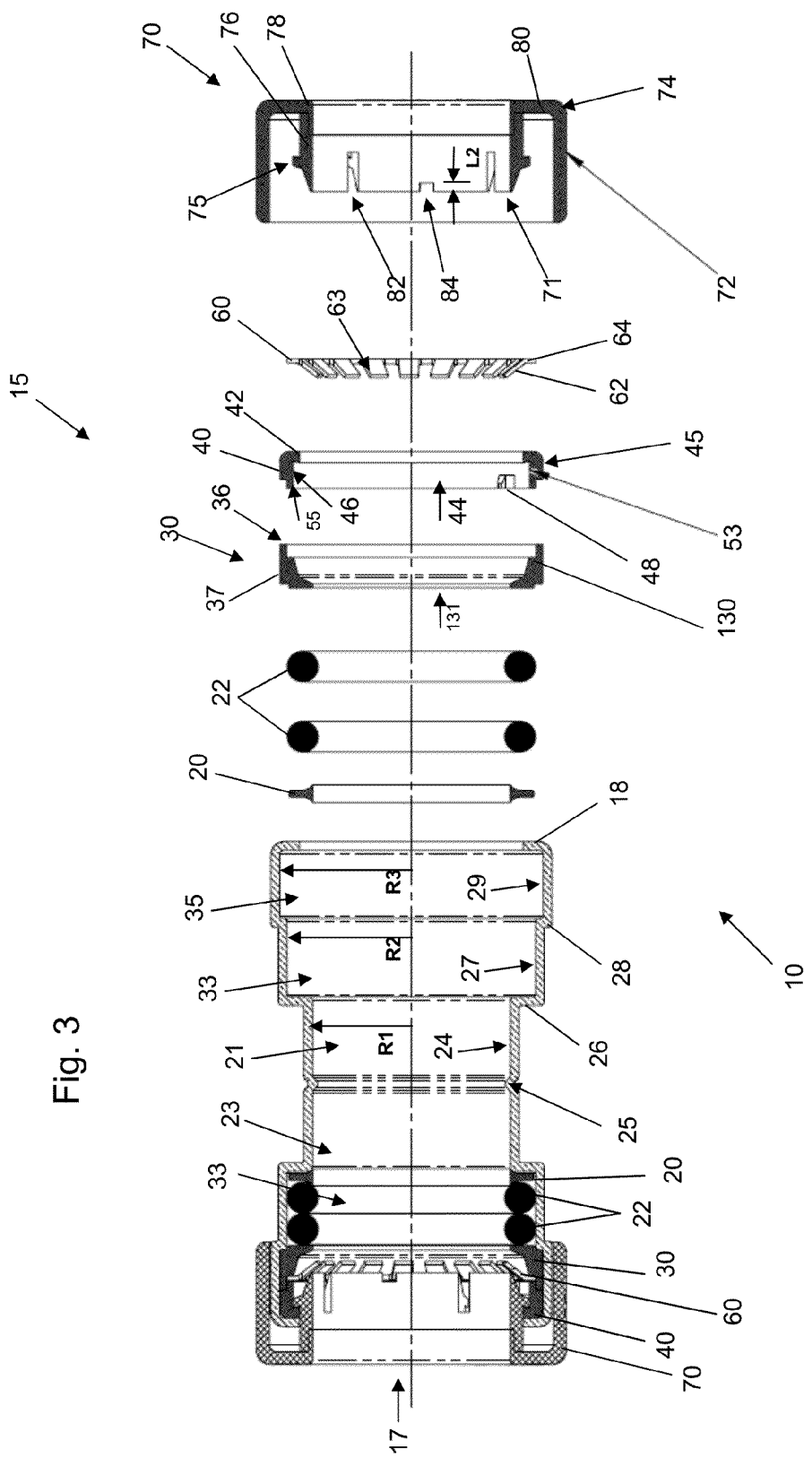
FIG. 3 is a front cross-sectional view of the embodiment of the present invention according to FIG. 2.

In the embodiment of the present invention as shown in FIGS. 1 through 3, the fitting 12 is formed with a tube stop element 25 and several steps extending radially into the cavity 17. The tube stop element 25 acts to stop inserted tubes from going any further into the fitting. The fitting 12 includes first 21 and second 23 interior wall portions separated by the tube stop element 25. It will be appreciated that, while the interior wall portions 21 and 23 are substantially identical and substantially mirror images of one another as shown in FIG. 3, the first interior wall portion 21 may differ from the second interior wall portion 23 depending upon a given embodiment of the present invention, such as when the form of the fitting is an end stop or other form, for example. In the substantially mirror image embodiment, as shown in FIGS. 1 through 3, the second interior wall portion 23 can be provided with corresponding radial ledge and radial steps as described herein in connection with the first interior wall portion 21. As further shown in FIG. 3, the first interior wall portion 21 is formed so as to have an axially interior wall surface 24, a radial ledge 26, an axially intermediate wall surface 27, a radial step 28, and an axially exterior wall surface 29, wherein the radial ledge 26 and the axially intermediate wall surface 27 define boundaries of a sealing compartment 33, and the radial step 28, axially exterior wall surface 29 and end wall 18 define boundaries of a locking compartment 35. As further shown in FIG. 3, the fitting 12 can include a packing arrangement having at least one sealing ring 50 positioned within the sealing compartment, a fastening ring 60 positioned between the snap ring member 30 and the pusher locking member 40 and a release pusher member 70 adapted to slidingly engage the fitting end wall 18 and lockingly engage the pusher locking member 40. The pusher locking member 40, the release pusher inner wall 76, the snap ring member 30 and the fastening ring 60 are cooperatively secured within the fitting locking compartment 35.

As shown in FIGS. 3 through 7, for example, the release pusher 70 includes a substantially cylindrical outer wall 72 having an axially outer end 74, a substantially cylindrical inner wall 76 having an axially outer end 78, and an axially outer wall 80 connecting the axially outer end 74 of the outer wall 72 and the axially outer end 78 of the inner wall 76, with the inner wall 76 having a wing 75 extending radially outwardly around the circumference of the inner wall 76, and wherein the inner wall 76 is further formed so as to include one or more access channels 82 and one or more stop channels 84, wherein the access channels and the stop channels are engageable with one or more nipple members of the pusher locking member 40 as described elsewhere herein. In embodiments of the present invention, the release pusher can comprise an injection-molded plastic material or a metal material such as brass, for example. In embodiments of the present invention, the inner wall 76 and outer wall 72 are substantially concentric in cross-section, as shown in FIGS. 4A through 7. When pressure is applied on the axially outer wall 80 of the release pusher 70, the external tip 71 can engage the inside surface 63 of the fastening ring teeth 62, and the wing 75 can engage a retaining lip 42 extending radially inwardly from the pusher locking member 40.

If removal of the release pusher is required, a tool such as a specially adapted wrench, for example, can be applied to the outer top surface of the release pusher so as to exert a pushing and lifting force that causes the release pusher wing 75 to disengage the retaining lip 42. Once the release pusher is removed, the internal packing arrangement components are exposed for removal and/or replacement. When inserted, the inner wall 76 of the release pusher 70 is maintained within the cavity 17 of the fitting 12 while the outer walls 72 and 80 are maintained outside of the fitting. In this way, a user can grasp the outer wall 72 for rotating the pusher 70 and can push the outer wall 80 for moving the pusher 70 axially inwardly when inserting or releasing a tube member. The release pusher can comprise an injection-molded plastic material or a metal material such as brass, for example.

In embodiments of the present invention, the one or more access channels 82 and the one or more stop channels 84 extend axially along the inner wall 76 of the release pusher 70. Further, the one or more access channels 82 can be provided with an access channel length L1 that is longer than the length L2 of the one or more stop channels 84, as shown in FIGS. 3 and 5. In embodiments of the present invention, as shown in FIGS. 4B and 7, the access channels 82 can extend through the wing 75 of the inner wall 76, whereas the stop channels 84 do not extend into or through the wing 75. In this way, the wing 75 does not prevent movement of the inner wall 76 over the nipple members of the pusher locker member during operation, thereby allowing the pusher to extend axially inwardly to flex the fastening ring teeth as desired during operation of the present invention. In embodiments of the present invention, as shown in FIGS. 4B and 7, the release pusher 70 includes four access channels 82 spaced in equidistant relation along the circumference, and further includes two stop channels 84. While the channels are shown as substantially rectangular, it will be appreciated that other shapes of channels 82, 84 can be provided in the pusher 70 in order to accommodate different mating shapes of the nipple members of the pusher locking member 40, described elsewhere herein.

As shown in FIGS. 1 through 3 and 8 through 13, the pusher locking member 40 has a substantially ring-shaped body 41 forming a locking member opening 44 extending therethrough, wherein the locking member body 41 has a radially outer surface 45 and a radially inner surface 46, with at least one nipple member 48 extending radially into the locking member opening 44 from the radially inner surface 46. In embodiments of the present invention, the locking member 40 includes two nipple members 48 spaced one hundred eighty degrees apart about the circumference of the member 40. In embodiments of the present invention, the locking member body 41 has an axially inner ledge portion 55 and a rampart portion 53 extending radially outwardly of the radially outer surface 45. The locking member body 41 is further provided with an axially inner retaining lip portion 42 extending radially inwardly into the locking member opening 44. The rampart portion 53 engages the axially exterior inner surface 29 of the fitting 12 in the locking compartment 35 of the fitting 12 when inserted in the fitting, and is securely maintained therein. The inner retaining lip portion 42 of the locking member 40 further includes a radially inner surface 54 and an axially inner surface 52. These surfaces 52, 54 snugly engage the wing 75 of the inner wall 76 of the release pusher 70 when the release pusher is inserted into the fitting 12.

As shown in FIGS. 1 through 3, embodiments of the joint packing arrangement of the present invention further include a snap ring member 30 having a substantially ring-shaped body 130 forming an opening 131 extending therethrough, and further having an axially outer wall 36 for engaging the inner ledge portion 55 and the rampart portion 53 of the locking member 40, within the locking compartment 35. The radially outer wall 37 of the ring member 30 is securely maintainable against the axially exterior inner wall 29 of the fitting 12. In embodiments of the present invention, the radially outer wall 37 of the ring member 30 and the rampart portion 53 of the locking member 40 are sized so as to be securely maintained within the locking compartment 35.

The fastening ring 60 is fixedly securable between the snap ring member 30 and the pusher locking member 40. In embodiments of the present invention, the fastening ring base 64 is pinched and held between the axially inner ledge portion 55 of the locking member 40 and the axially outer wall 36 of the snap ring member 30.

In operation, when the slots 82 are aligned with the nipple member(s) 48 of the pusher locking member 40, and as force is applied to the release pusher 70 in order to insert the pusher 70 further into the fitting 12, the beveled edge or tip 71 of the pusher 70 will abut and depress the fastening ring teeth 62. In the event the slots 82 are not aligned with the nipple member(s) 48 when first inserted, the user can rotate the pusher 70 in order to find alignment of these elements. The wing 75 of pusher 70 abuts the radial lip 42 of the locking member 40, which provides for smooth engagement and permits stable rotation of the pusher 70 as necessary. The nipple members 48 are guided through corresponding slots 84, and when the pusher is rotated (e.g., counter-clockwise), the nipple members 48 move along the beveled edge external surface 73 (see FIG. 4C) of the inner wall 76 of the release pusher 70 and become locked in a respective stop channel 84. When the user wishes to unlock the release pusher 70 from the locking member 40, the user can push the release pusher back further into the fitting, rotate the pusher (e.g., clockwise) such that the nipple members 48 slide back into alignment with the access channels 82, and the release pusher can then be moved further into the fitting to engage the fastening ring teeth 62 such that the fastening ring's grip on an inserted tube can be relaxed, thereby allowing removal of the inserted tube.

It will be appreciated that in embodiments of the present invention, the one or more access channels 82 are movably but not lockingly engageable with the nipple member(s), and the one or more stop channels 84 are lockingly engageable with the nipple member(s). Further, in embodiments of the present invention with four access channels 82, two stop channels 84 and two nipple members 48, as shown in FIGS. 4B, 7 and 8, it will be appreciated that a quarter-turn rotation of the pusher member 70 from the locked position will be required (in either direction) in order to align the nipple members 48 with the access channels 82 in order to allow the pusher to depress the teeth 62 of the fastening ring 60.

As further shown in the embodiment of the present invention depicted in FIG. 7, the first interior wall portion 21 has a first radius R1 extending to the axially interior wall surface 24, and the sealing compartment 33 has a sealing compartment radius R2 that is larger than the first radius R1. Further, the locking compartment 35 has a locking compartment radius R3 that is larger than the first radius R1. In one embodiment of the present invention, the locking compartment radius R3 is also larger than the sealing compartment radius R2. By providing the fitting 12 in this embodiment of the present invention with a "barbell" type shape, with the radii increasing as the fitting extends axially outwardly from the stop element 25, the present invention permits a tight and snug engagement of the inserted tube through the sealing rings in the sealing compartment, the fastening ring, and the locking ring in the locking position.

In one embodiment of the present invention, the sealing members 22 can be housed so as to substantially abut one another within the sealing compartment 33, as shown in FIG. 3. Further, the sealing members 22 are shown axially inward of the fastening ring 60, when in position within the fitting 12.

It will be appreciated that the sealing members can comprise a flat ring or washer-type seal member in addition or as an alternative to a circular member of substantially circular cross-section. It will further be appreciated that one or more sealing members can comprise a "wiper" seal having a portion of substantially circular cross-section and another portion(s) that is flattened out. Such an embodiment can assist in maintaining a sufficient seal when fluids at higher pressure are passing through the underlying piping. In one embodiment, two sealing members are provided, one of which is substantially circular in cross-section throughout, and a second of which has the wiper seal design described above.

The fastening ring 60 can comprise a spring steel formulation, for example, that enables the fastening ring to be malformed during installation, while springing back into its originally manufactured position once installed. The fastening ring has a substantially cylindrical base 64, and is capable of grabbing an inserted pipe's surface via two or more teeth 62 to ensure connections cannot be pulled apart. The fastening ring can further include fixture points for handling and compressing the fastening ring. In one embodiment of the present invention, the fixture points are provided at the split end so that a tool designed to hold the fastening ring at the fixture points can more easily handle and compress the fastening ring in order to assist with assembly or disassembly. The fastening ring teeth are angled downward from the substantially cylindrical perimeter of the ring, toward the fitting and away from the cap, such that when the pipe is inserted, the teeth exert a pressure against the pipe to discourage the pipe from slipping or moving back out of the fitting. No wrenches, solder, welding, glue and/or twisting and turning the elements are required to form a connection. While the fastening ring 60 is shown in FIGS. 1 through 3 as an integral ring, it will be appreciated that it may also have a split in the base 64, which can assist in more easily installing the ring 60 within the fitting 12.

It will be appreciated that the present invention provides various methods for assembling and operating piping joint assemblies, including, for example, providing a fitting as described elsewhere herein, wherein the fitting has an outer wall, and an inner wall, wherein the inner wall defines a locking compartment and a pipe receiving cavity extending along a longitudinal axis of the fitting; inserting a pusher locking member into the fitting so as to be maintained within the locking compartment; and securing a release pusher to the pusher locking member, the release pusher having a substantially cylindrical outer wall having an axially outer end, a substantially cylindrical inner wall having an axially outer end, and an axially outer wall connecting the axially outer end of the outer wall and the axially outer end of the inner wall, wherein the release pusher is secured to the locking member such that the inner wall is axially movable into the cavity, and rotatable about the fitting longitudinal axis.

In assembly, the fitting 12 of the present invention is provided, a sealing ring stabilizer element 20 can optionally be inserted in the sealing compartment 33 and one or more sealing members 22 are inserted into the sealing compartment 33, as shown in interior portion 23 of the fitting of FIG. 3. Next, the snap ring member 30, fastening ring 60 and pusher locking member 40 are inserted into the locking compartment 35, and release pusher 70 is then coined or snapped into engagement with the retaining lip 42 of the locking member 40. When a pipe or tube (not shown) is inserted, it travels through the release pusher 70 into the pipe receiving cavity 17 of the fitting 12, engaging the one or more sealing members 22. The sealing members 22 provide a strong, leak-free seal and the fastening ring, when released so as to be engaged with the inserted tube, prohibits any inclination the tube may have to slide out of position inside the pipe fitting 12.

Figure 16:
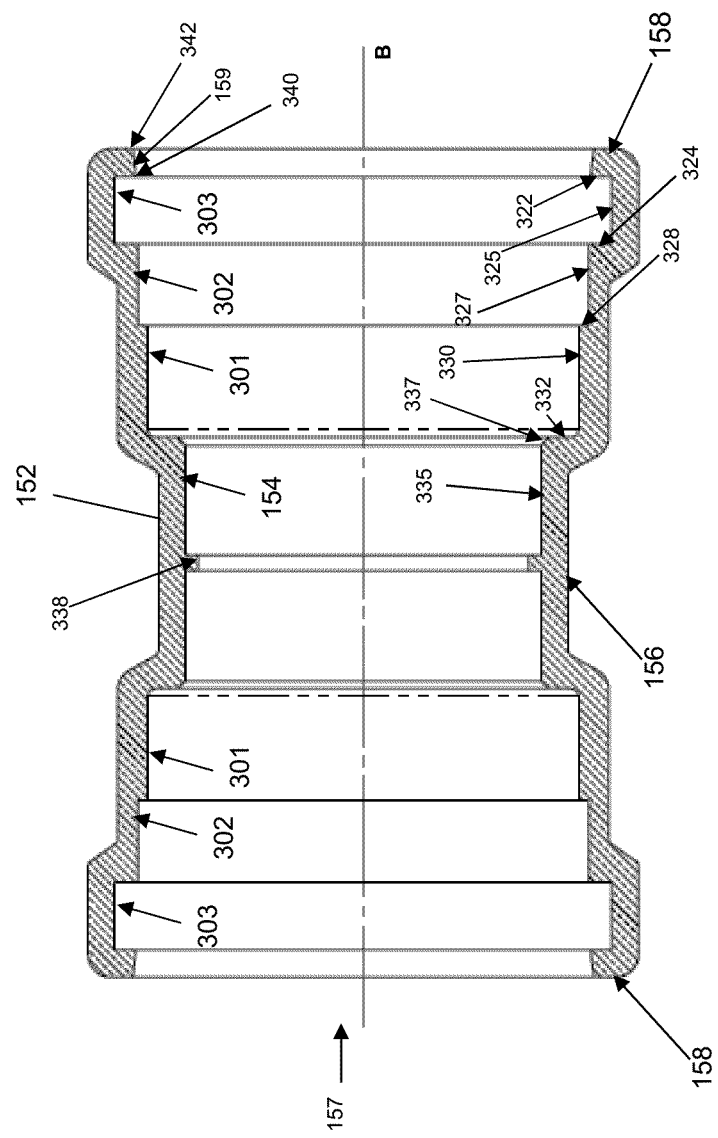
FIG. 16 is a front cross-sectional view of a fitting body member in accordance with embodiments of the present invention.

In the push-fit piping joint assembly 150 according to additional embodiments of the present invention, as shown in FIGS. 14 through 28, for example, elements of the joint assembly as shown include: a fitting (i.e., fitting body member) 152 having an interior wall 154, an exterior wall 156, end walls 158, a spacer gland member 160, one or more sealing members 162 (which can be optionally lubricated), a retaining ring member 164, a pusher locking member 166, a fastening ring 168 and a release pusher 170. The fastening ring 168, sealing members 162, spacer gland member 160, retaining ring 164, pusher locking member 166 and release pusher 170 together, and in subset combinations, provide embodiments of a packing arrangement 165 for the present invention, and each has a substantially ring-shaped body forming an opening extending axially therethrough, such as along axis B, for example. The axial opening allows for smooth and snug engagement of a piping or tubing element external surface (not shown). The interior wall 154 of the fitting 152 is adapted to provide axially inner 301, axial middle 302 and axially outer 303 compartments. The axially outer compartment 303 is defined, at least in part, by inner edge 322 of end wall 158 and first step 324 extending axially inward of segment 325 of the interior wall 154. The end wall 158 also comprises a radially inner ledge 159. In embodiments of the present invention, as shown in FIG. 16, for example, ledge 159 is not parallel with inner wall 154, but is sloped outwardly such that the axially inner edge 340 of ledge 159 extends radially inwardly further than axially outer edge 342. In this way, ledge 159 is sloped to better facilitate ingress and egress of retaining ring member 164 during operation. The axially middle compartment 302 is defined, at least in part, by segment 327 of the interior wall 154 and second step 328 extending axially inward of segment 327. The axially inner compartment 301 is defined, at least in part, by segment 330 of the interior wall 154 and third step 332 extending axially inward of segment 330. It will be appreciated that these compartments 301, 302 and 303 are integrally formed with the fitting 152, and act to securely retain elements as described herein. It will also be appreciated that segment 330 is axially inward of segment 327, and segments 330, 327 are axially inward of segment 325. Another segment 335 of interior wall 154 comprises a piping element receiving wall that abuts the outer wall of a tube (i.e., piping element) as it is inserted and removed from the fitting 152. It will be appreciated that step 332 can include a beveled upper edge 337 adjacent segment 335, which can facilitate ingress and egress of tubes into the fitting 152, as shown in FIG. 16, for example. The tube stop element 338 extends radially into a pipe receiving cavity 157 from segment 335 of interior wall 154, and acts to stop inserted tubes from going any further into the fitting 152.

The interior wall 154 of fitting 152 defines the pipe receiving cavity 157 extending axially through the fitting. In one embodiment, the interior diameter of the fastening ring 168 (as measured to the teeth 163 at rest, and not the ring cylindrical base 167) is smaller than the interior diameter of the sealing members 162, and the interior diameters of the fitting 152, locking member 166 and the release pusher 170 are substantially the same. Further, the interior diameters of the fastening ring 168 and sealing members 162 can be slightly less than that of the fitting 152, locking member 166 and release pusher 170 so as to facilitate proper operation of the present invention. The one or more sealing members 162 can be housed within the axially inner compartment 301, and maintained therein by the axially inner wall 310 of the spacer gland member 160. The axially outer edge 312 of the spacer gland member 160 securely engages the surface segment 330 of the interior wall 154 of the fitting 152. The spacer gland member 160 further includes an axially extending corner wall 314 and a radially extending corner wall 316 to engage the step 328 of axial middle compartment 302 and segment 330 of axially inner compartment 301. The axially outer edge 318 of the spacer gland member 160 engages the axially inner portion of the base 167 of the fastening ring 168. The axially outer portion of the base 167 is maintained in place in the axially middle compartment 302 by an axially inner edge 197 of the retaining ring 164 of the present invention, as shown in FIG. 19.

Figure 14:
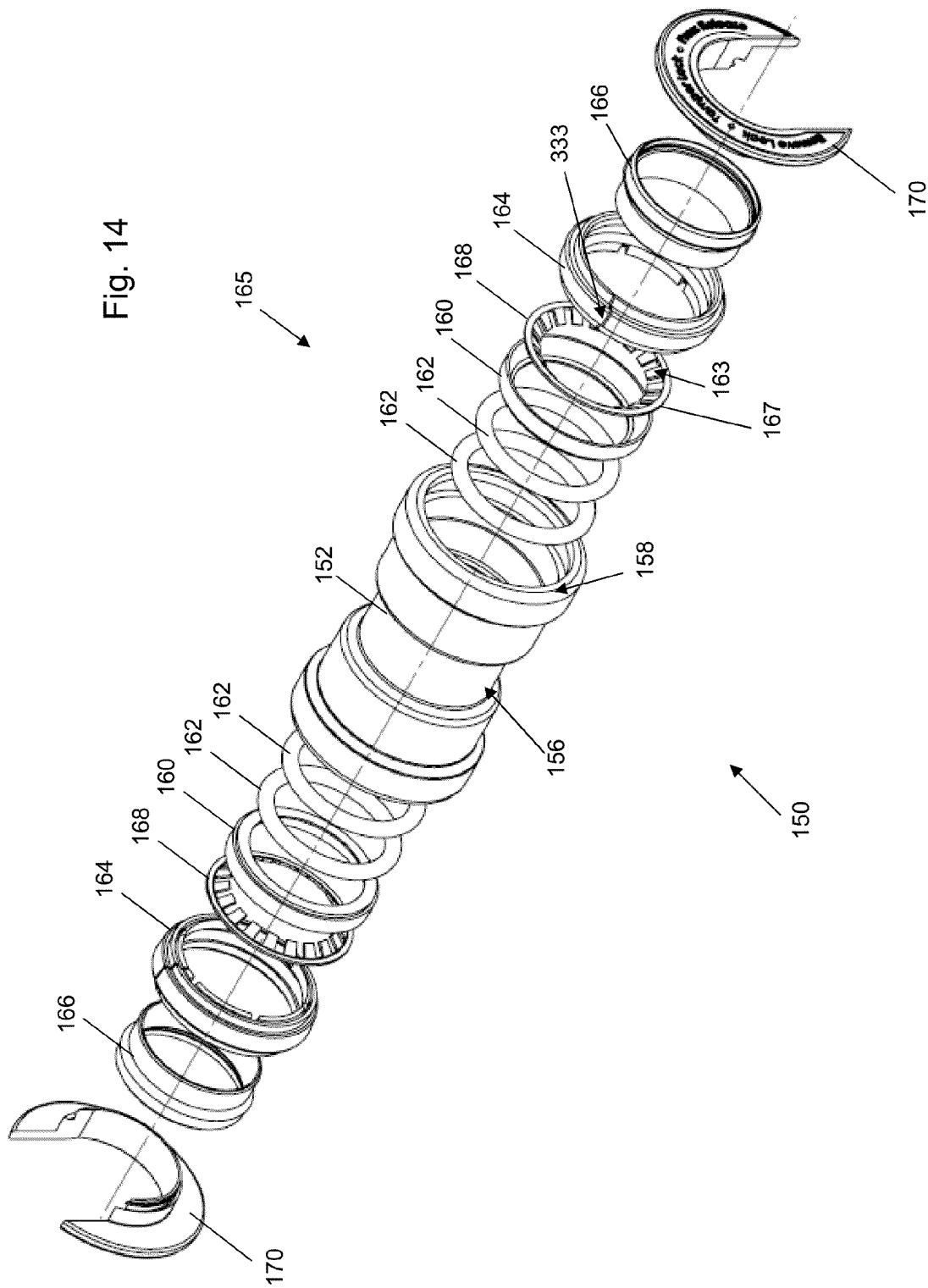
FIG. 14 is an exploded front perspective view of one embodiment of a piping joint assembly package in accordance with embodiments of the present invention.
Figure 15:
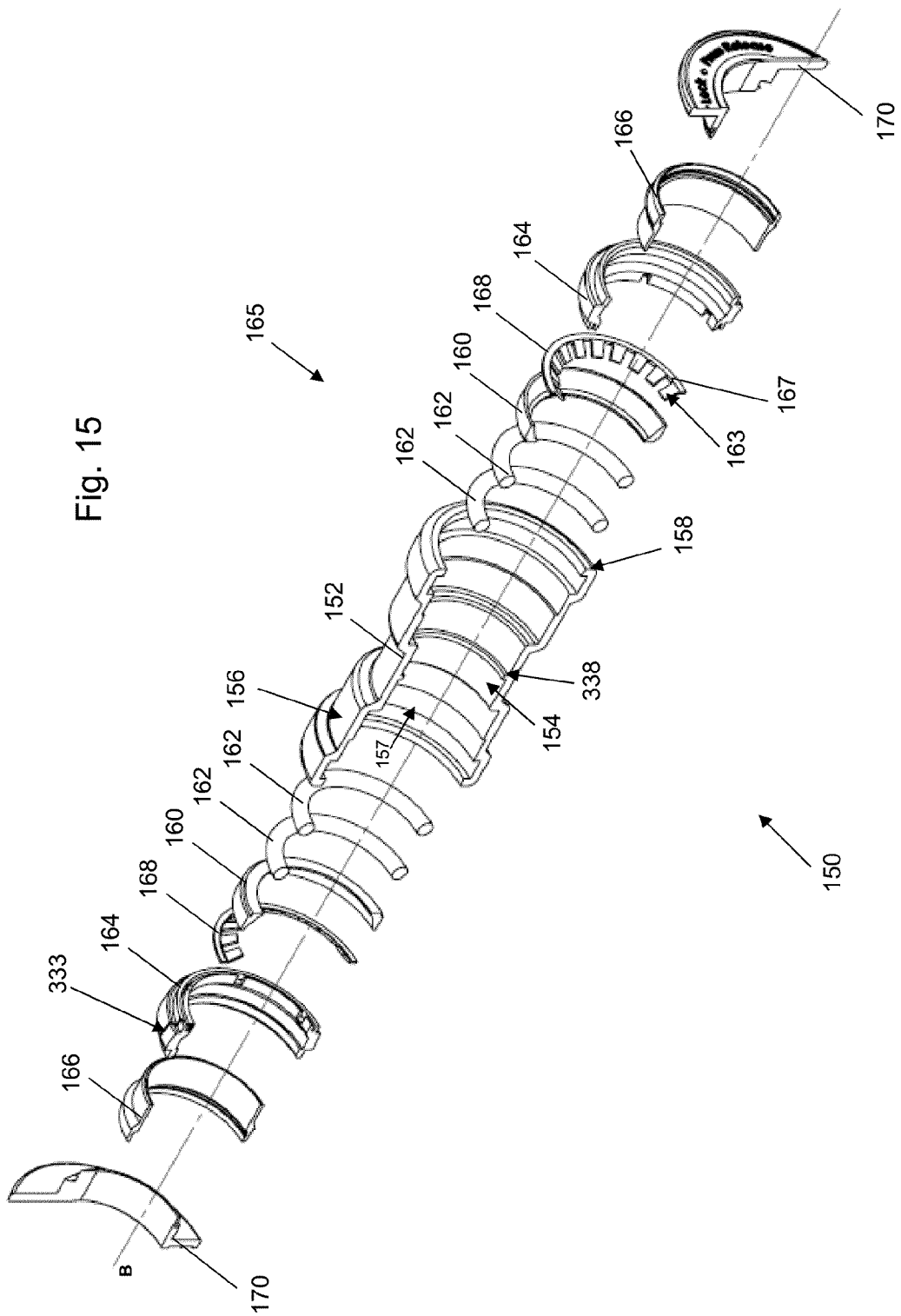
FIG. 15 is an exploded front perspective cross-sectional view of the piping joint assembly package of FIG. 14.
Figure 17:
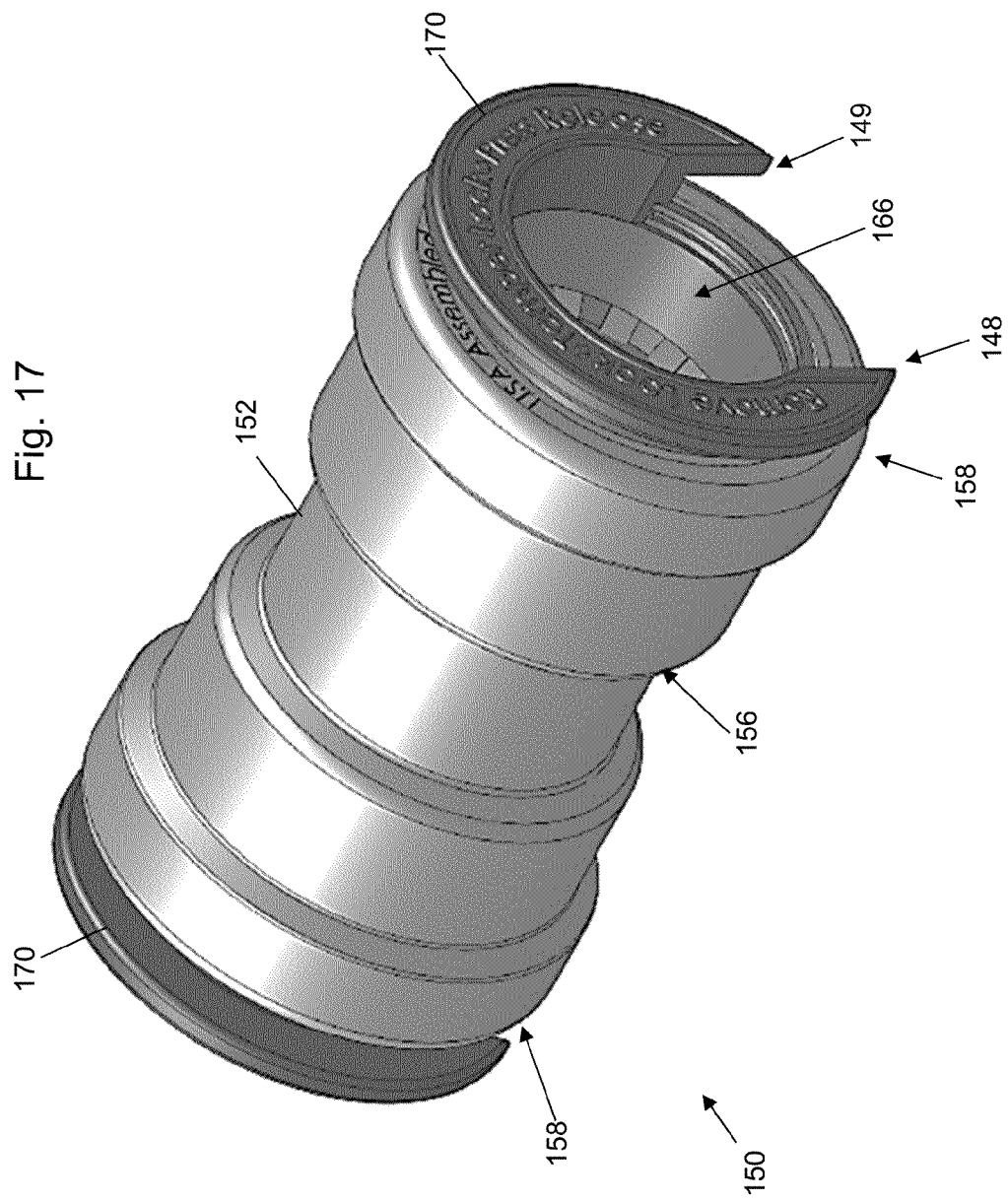
FIG. 17 is a perspective view of one embodiment of a piping joint assembly package in accordance with the present invention.

As shown in FIGS. 19 and 23 through 25, the pusher locking member 166 is substantially cylindrical and includes an external tip 171 for engaging the teeth 163 of the fastening ring 168 as described in more detail elsewhere herein. The release pusher 170 can be substantially cylindrical, as shown in FIGS. 1 and 7. Alternatively, the release pusher 170 can be substantially U-shaped as shown in FIGS. 14, 17 and 26. The U-shaped embodiment of the release pusher 170 assists with insertion and removal of the release pusher 170 into the pusher locking member 166. For example, once a tubing member is inserted into the fitting 152, the release pusher 170 can be removed by initiating a lifting force on one of the edges 148, 149. The removal of the release pusher 170 helps make the device tamper-resistant because there is no mechanism (e.g., a release pusher) to influence the fastening ring teeth inward and thereby allow the inserted tubing element to be removed. Once removed, the release pusher 170 can be re-installed by securing it over the inserted tubing element and snapping it into place with the pusher locking member 166.

Figure 18:
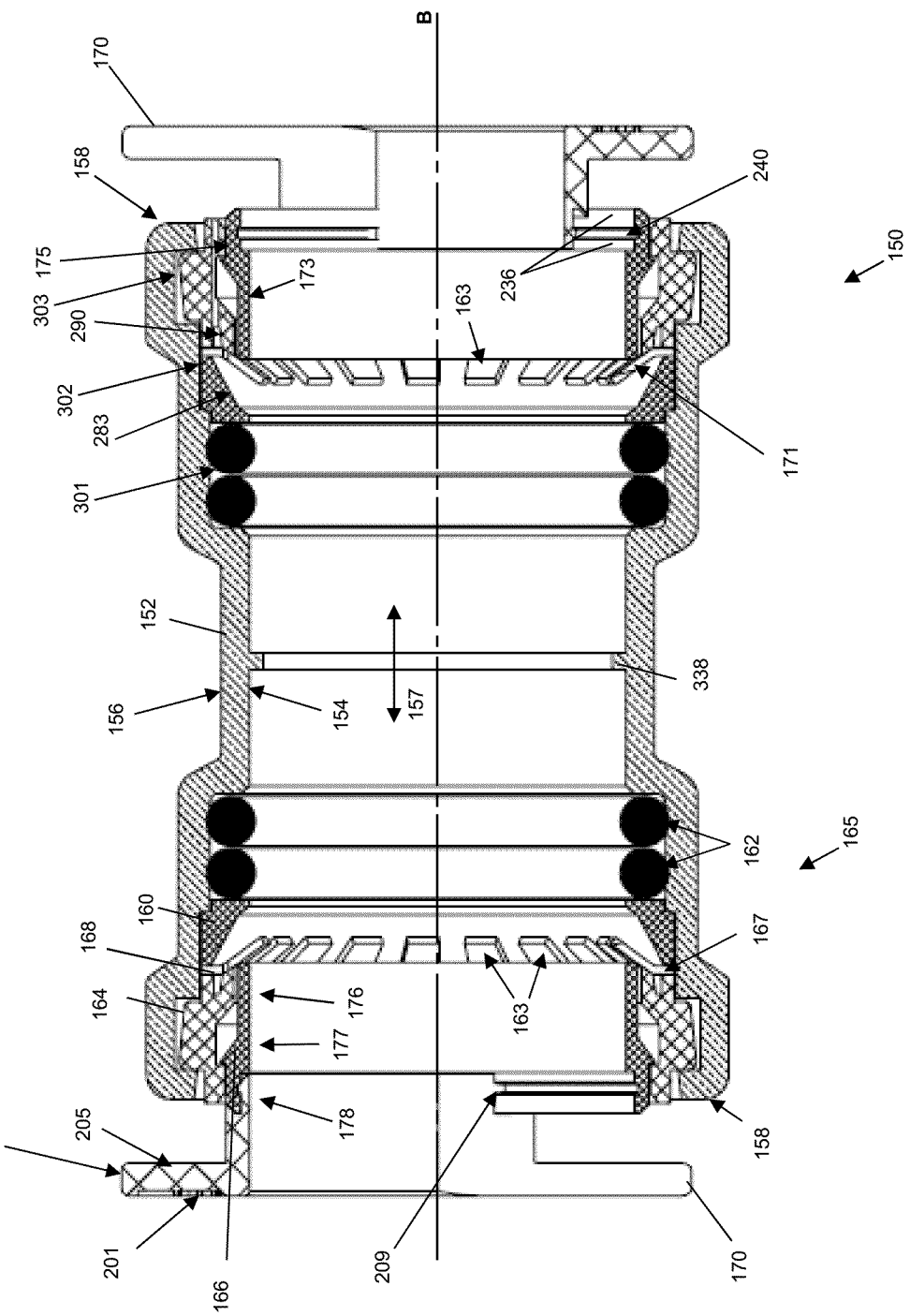
FIG. 18 is a front cross-sectional view of a fitting body member with inserted piping joint assembly package in accordance with embodiments of the present invention.
Figure 19:
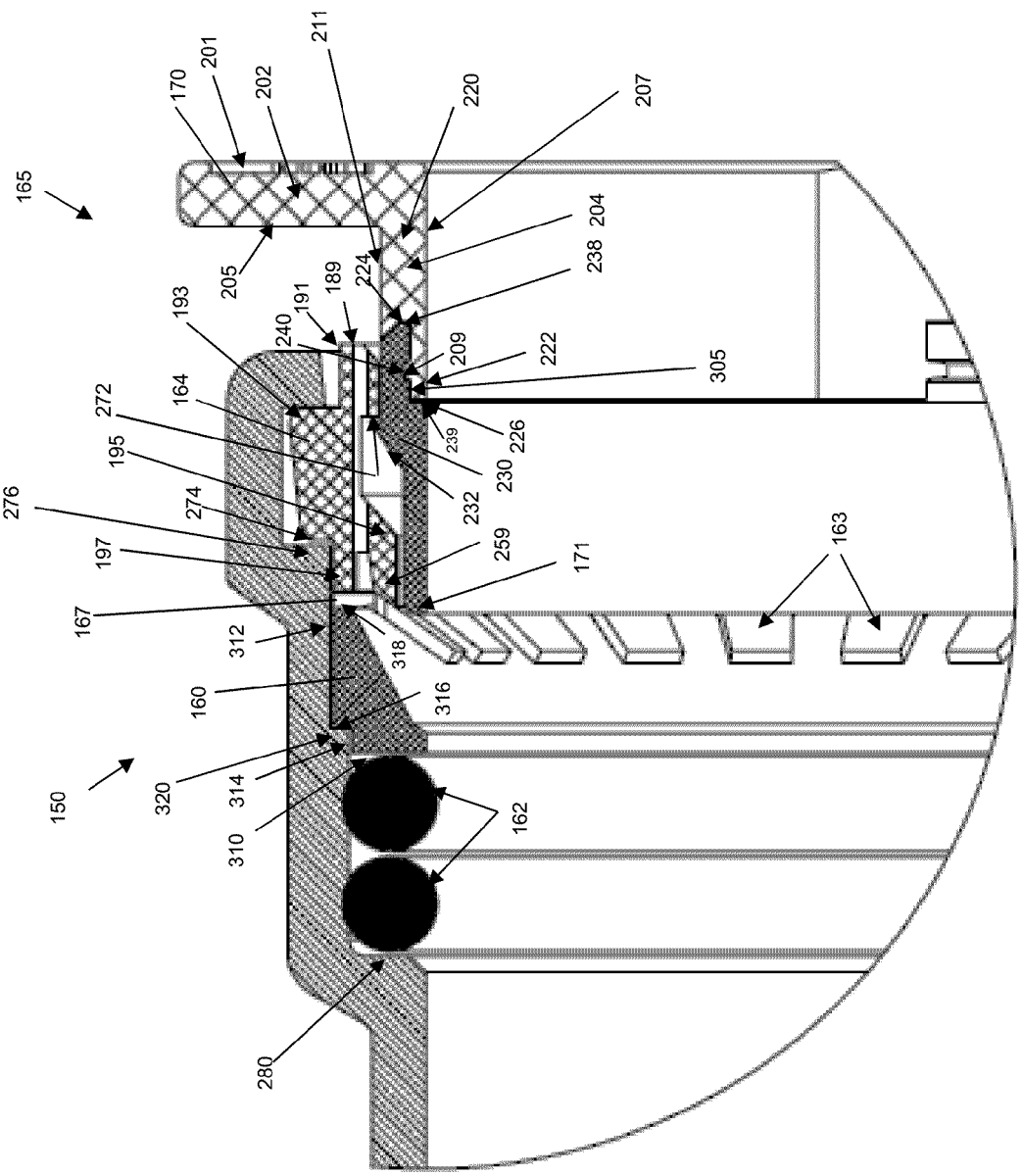
FIG. 19 is an enlarged view of the portion of the piping joint assembly package shown in box 19-19 of FIG. 18.
Figure 24:
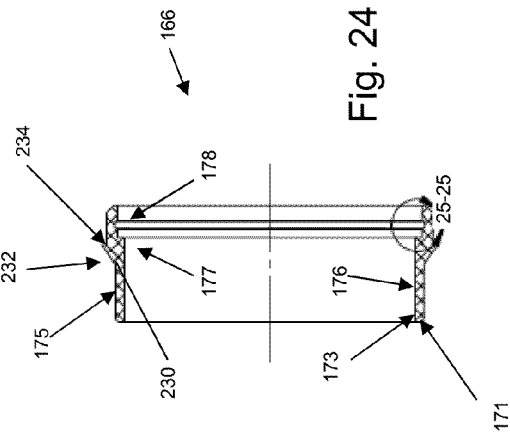
FIG. 24 is a right side cross-sectional view of the embodiment of the retaining clip element taken along the line 21-21 of FIG. 20.
Figure 28:
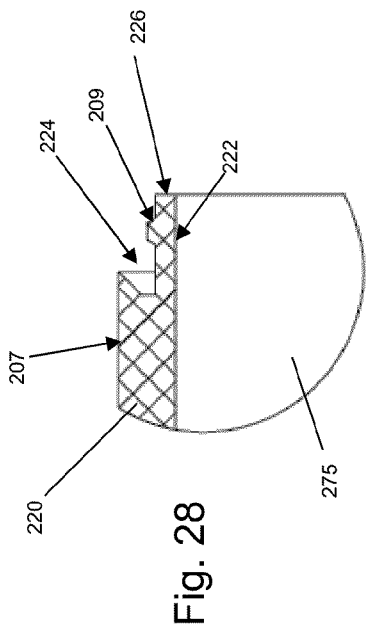
FIG. 28 is an enlarged view of the portion of the release pusher shown in encircled portion 28-28 of FIG. 27.

As further shown in FIGS. 14 through 19 and 26 through 28, the release pusher 170 includes a head portion 202 and a neck portion 204. The head portion includes an external surface 201, an edge surface 203 and an internal surface 205. The neck portion 204 includes an inner radial wall 207 and an outer radial wall 211. The neck portion 204 further includes a base portion 220 and an extension portion 222 extending from the base portion 220. The extension portion 222 is not as thick, with respect to radial breadth, as the base portion 220 in order to properly engage the pusher locking member 166 as described in more detail hereinafter. The base portion 220 has a mid-wall surface 224 and the extension portion 222 has an end wall surface 226, with the end wall surface 226 being substantially parallel with the external 201 and internal 205 surfaces of the head portion 202. These surfaces 226, 201 and 205 are substantially perpendicular to the B axis (shown in FIG. 18) and the direction of travel of a piping element being inserted or removed. In embodiments of the present invention, mid-wall surface 224 can also be substantially parallel with end wall surface 226. As shown in FIGS. 19 and 28, for example, mid-wall surface 224 is substantially curved and/or angled so as to form a mating axial and radial surface for an axially outer end wall 238 of pusher locking member 166, which assists in retaining these elements in cooperative engagement during operation.

As shown in FIGS. 18 and 19, the end wall 226 of pusher 170 is capable of cooperatively engaging an intermediate wall 239 of the pusher locking member 166 and the mid-wall 224 is capable of cooperatively engaging the axially outer end wall 238 of the pusher locking member 166. The neck portion 204 of the pusher 170 further includes a locking member engaging ridge 209 extending radially outwardly of the outer radial wall 305 of the extension portion 222 of the neck portion 204 of the release pusher. The engaging ridge 209 can snap into place within a radial slot 240 formed along wall segment 236 of the pusher locking member 166.

As shown in FIGS. 14 through 19 and 23 through 25, the pusher locking member 166 includes a radially inner surface 173 and a radially outer surface 175, and further includes an axially inner segment 176, an axial mid-segment 177 and an axially outer segment 178. The axially inner segment 176 is of a substantially consistent radial thickness, and includes a radially extending tip edge 171. The axial mid-segment 177 includes an angled ramp element 230 extending radially outwardly from the radially outer surface 175 of the member 166, wherein the ramp element 230 has an axially inner face 232 and an axially outer wall 234. In embodiments of the present invention, the axially inner face 232 extends from the radially outer surface 175 at an angle of from approximately thirty degrees to approximately sixty degrees. The axially outer wall 234 of the ramp element 230 is substantially perpendicular to the radially inner surface 173 of the pusher locking member 166, as well as to the B axis (shown in FIG. 18). The axially outer segment 178 of the pusher locking member 166 includes a wall segment 236 that is substantially parallel to the radially inner surface 173 of the pusher locking member 166. The axially outer segment 178 includes an axially outer end wall 238 that is substantially perpendicular to the radially inner surface 173 of the pusher locking member 166, as well as to the B axis, and further includes an intermediate wall 239 that is substantially parallel to the axially outer end wall 238. The axially outer segment 178 further includes a beveled edge surface 244 extending from the outer end wall 238 to the radially outer surface 175, and the beveled edge surface 244 facilitates proper movement of the pusher locking member 166 with the retaining clip 164, such that the pusher locking member 166 does not become stuck in the inserted position when the release pusher 170 is pushed axially inwardly of the fitting 152. Rather, the beveled edge surface 244 allows the pusher locking member 166 to smoothly extend back axially outwardly of the fitting when pressure on the release pusher 170 is released. With a squared-off edge, the pusher locking member 166 might be caught with end wall 238 catching the radial mid-wall 272 of the retaining clip member 164.

Figure 25:
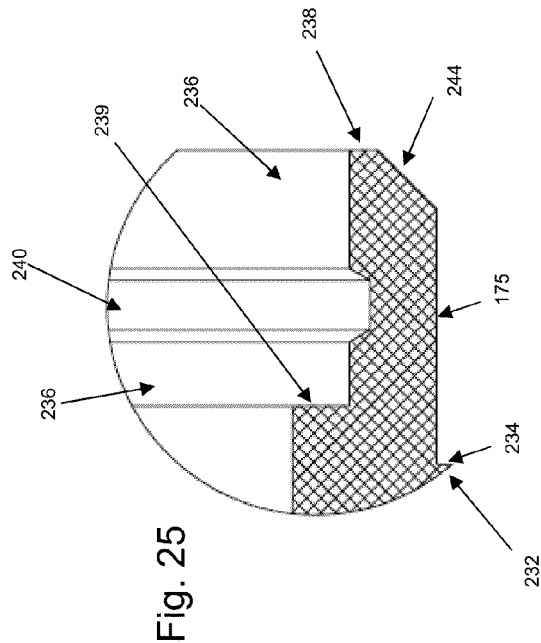
FIG. 25 is an enlarged view of the portion of the retaining clip element shown in encircled portion 22-22 of FIG. 21.
Figure 23:
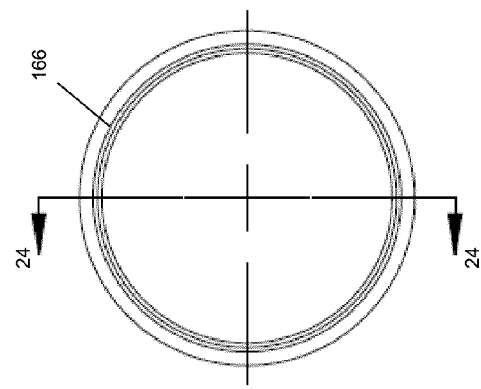
FIG. 23 is a front view of one embodiment of the retaining clip element of the present invention.
Figure 27:
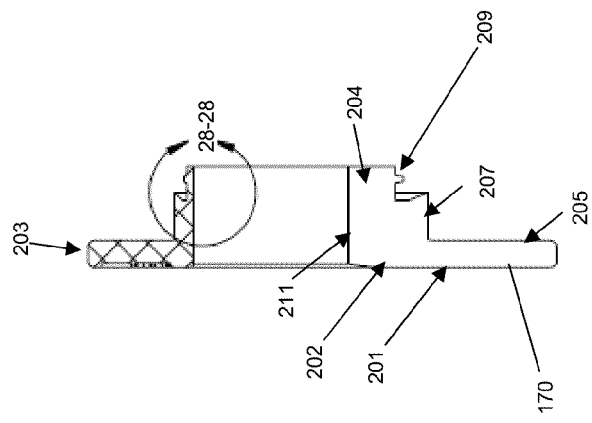
FIG. 27 is a right side cross-sectional view of the embodiment of the release pusher taken along the line 27-27 of FIG. 26.
Figure 26:
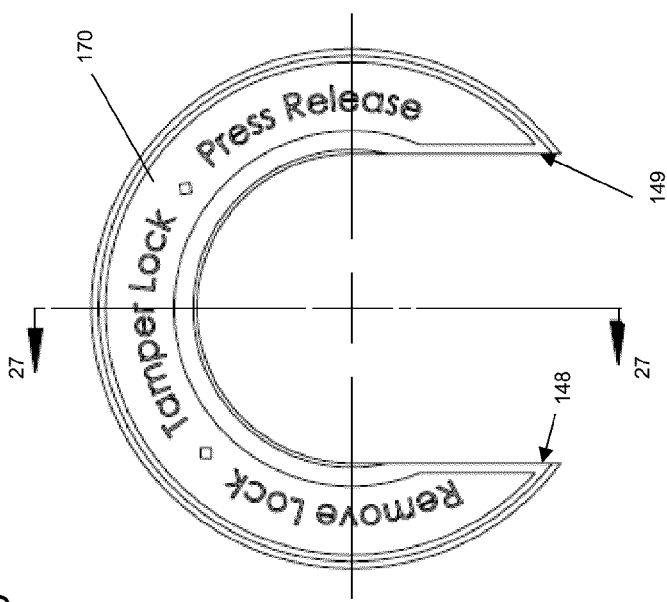
FIG. 26 is a front view of the release pusher in accordance with embodiments of the present invention.

As shown in FIGS. 18, 19 and 25, the wall segment 236 includes a radial slot 240 formed therein, and has a larger radius than the radially inner surface 173 along the axially inner 176 and axial mid 177 segments of the pusher locking member 166. In this way, the pusher locking member 166 can readily and cooperatively engage the extension portion 222 of the neck portion 204 of the release pusher 170 as described above, while maintaining a smooth and substantially axially aligned interior surface (surface 175 of pusher locking member 166 and surface 275 of release pusher 170), smoothly allowing a piping element to be inserted and removed.

The engagement of the release pusher ridge 209 and pusher locking member slot 240 facilitates tamper-proof aspects of the present invention. For instance, when the pusher locking member 166 is locked and engaged with the retaining ring 164, it cannot be rotated, pushed or pulled without the release pusher 170. Should the release pusher 170 be disengaged from the pusher locking member 166, the locking member 166 will be maintained in position and cannot be moved so as to allow an inserted piping element to be removed. On the other hand, when the release pusher 170 and the pusher locking member 166 are engaged, the pusher 170 can push the locking member 166 into the cavity, thereby expanding the teeth 163 of the fastening member 168 to allow a piping element to be easily inserted or removed.

As further shown in FIGS. 15 through 22, a retaining clip member 164 is positioned within the axially outer compartment 303 of the fitting, and extends partially into the axially middle compartment 302. The retaining clip 164 cooperatively engages the pusher locking member 166 and has an axially inner edge 197 that assists in retaining the base 167 of the fastening ring 168 in position during operation. The retaining clip 164 includes a radially inner surface 250, a radially outer surface 252, an axially inner edge portion 197, an axially outer edge portion 191 and an axial mid-segment 193. The axial mid-segment 193 is securely retained within the axially outer compartment 303 of the fitting 152 when installed. In embodiments of the present invention, the outer surface 252 of axial mid-segment 193 is not parallel with segment 325 of the inner wall 154 of the outer compartment 300 of the fitting, and therefore does not engage the segment 325 along the entire outer surface 252. For example, as shown in FIG. 22, the outer surface 252 extends at an angle D to the plane P where the segment 325 lies or would lie. In embodiments of the present invention, angle D can range from approximately one degree to approximately 30 degrees. By extending at an angle, the outer surface 252 allows retaining clip member 164 to be more easily inserted into fitting 152 during installation.

In embodiments of the present invention, the axially inner edge portion 197 and the axially outer edge portion 191 do not move axially or radially during operation. The axially inner edge portion 197 includes a platform 255, a radial back wall 256 extending from the platform 255, and one or more shoe-like extensions 257 extending axially inwardly from the radial back wall 256. In embodiments of the present invention, the shoe extensions 257 also extend somewhat axially inwardly from the platform 255. As shown in FIGS. 17 and 21, the shoe extensions 257 are formed with axial walls 259 that have gaps 260 therebetween. As further shown in FIGS. 18, 19 and 21, additional gaps 290 are formed between the platform 255 and the underside of the shoe extensions 257. Thus, the retaining clip is provided with gaps 260 in between adjacent shoe extensions 257 and a gap 290 in between platform 255 and the bottom surface of the shoe extensions 257. In embodiments of the present invention, the gaps 260 assist in permitting relative movement of the shoe extensions 257 as the extensions support the fastening ring teeth during operation. In embodiments of the present invention, one or more of the shoe extensions 257 are provided with an angled face 262 that is engageable with the back side of the teeth 163 of the fastening ring 168. When installed, and in the event a piping element is being removed (through forcible attempt with no pusher force applied, or with pusher force applied to release the teeth) from an inserted position within the fitting, the angled faces 262 of the shoe extensions 257 provide support and keep the fastening ring teeth 163 from flipping over inside the fitting and failing. In embodiments of the present invention, the retaining clip 164 is formed of a collapsible material to provide a level of flexibility for the shoe extensions 257 in supporting the teeth of the fastening ring.

As further shown in FIGS. 15 through 22, the retaining clip member 164 further includes, along the axial mid-segment 193, a radially inwardly extending blocker member 195 having an axially outer wall 198. In embodiments of the present invention, the axially outer wall 198 of the blocker member 195 extends at an angle of between thirty and sixty degrees from the floor 199 of the axial mid-segment 193. In embodiments of the present invention, the angle of the blocker member outer wall 198 matches the angle of the pusher member ramp wall 232. In this way, the pusher member ramp element 230 can slidingly engage the floor 199 and the ramp wall 232 can engage the blocker member axially outer wall 198 as the pusher locking member 166 is pushed towards the fastening ring. The ramp element 230 is thus maintained within an axially movable range extending from the blocker member axially outer wall 198 to a radial mid-wall 272 on the radially inward side of the axial mid-segment 193 of the retaining clip member 164. The axially outer edge portion 191 of the retaining clip 164 includes an outer wall 189 having a base wall surface 269 and an angled edge surface 270. The base wall surface 269 is substantially parallel to the end wall 158 of the fitting 152, and substantially perpendicular to axis B (shown in FIG. 18). The angled edge surface 270 is angled so as to extend axially inwardly from the base wall surface 269 to the radially inner surface 250 of the retaining ring. In this way, the angled edge surface 270 facilitates easier insertion and removal of piping elements at the axially outer edge 158 of the fitting. The axial mid-segment 193 of the retaining clip member 164 further includes an axially inner wall 274 that cooperatively engages a radially extending first step 324 forming an axially internal wall for the axially outer compartment 303 of the fitting. In embodiments of the present invention, the retaining clip member 164 is formed with a split 333 extending from the radially outer surface through the radially inner surface thereof. In embodiments of the present invention, the split 333 can extend substantially radially through the member 164 (i.e., at a ninety degree angle to a plane Z moving through the axial midpoint M, as indicated by dashed line G in FIG. 20). In other embodiments of the present invention, the split extends at an angle H to the plane Z. Angle H can range from approximately one degree to approximately eighty-nine degrees from plane Z, and in specific embodiments where the angle H is from approximately one to approximately fifteen degrees or from approximately sixty to approximately eighty-nine degrees, the width of the split 333 is approximately 3/64 to 1/8 of an inch, whereas in specific embodiments where the angle H is from approximately fifteen degrees to approximately sixty degrees, the width of the split 333 is approximately 0.004 to 0.006 inches. The embodiments including the split 333 facilitate easier insertion of the clip 164 into the fitting during installation, as the clip 164 can be slightly compressed for easier manipulation. When inserted, the compression is relaxed, and the clip 164 can expand to sit snugly within compartment 303. In other embodiments of the present invention, the retaining clip member 164 is not split.

In assembly, one or more sealing members 162 are inserted into the cavity of the fitting 152 so as to be maintained within the axially inner compartment 301 of the fitting adjacent radial step 280. A sealing ring stabilizer/support member 160 is then inserted so as to abut the axially outer sealing member 162 and securely maintain the one or more sealing members 162 within the axially inner compartment 301. The sealing ring support member 160 includes a fastening ring stop wall 283, as shown in FIG. 18. A fastening ring 168 is then inserted, followed by the retaining ring 164, where the axially inner edge 197 of the retaining ring 164 abuts the base 167 of the fastening ring 168, thereby securely retaining the fastening ring 168 in position against the radially inner wall 154 along the axial middle compartment 302 of the fitting. The pusher locking member 166 is then inserted such that the ramp element 230 is maintained within the retaining ring 164 in the area between the blocker member 195 and the radial mid-wall 272 on the radially inward side of the axial mid-segment 193 of the retaining clip member 164. The release pusher 270 is then snapped into place such that the ridge 209 is received by the slot 240 of the pusher locking member 166. In one embodiment of the present invention, the inserted components including the sealing ring support member, the fastening ring, the retaining ring, the pusher locking member and the release pusher are split, so as to facilitate insertion and removal into the fitting interior. In other embodiments of the present invention, only one or more of the above components are split. In other embodiments, none of the above components is split.

When the fitting elements are inserted and in place, a piping element can be inserted in the fitting to the tube stop position 338 (FIGS. 16, 18). During insertion, it is not necessary, but it is possible to first push in the release pusher 170, which causes the pusher locking member tip 171 to engage the teeth 163 on the fastening ring 168. The fastening ring teeth 163 can move as far as the stop wall 283 on the sealing ring support member 160. Once moved from the path of the inserted piping element, the piping element can slide past the internal assembly to the tube stop 338. If the release pusher is not pushed in during insertion of a piping element, the piping element can still be inserted through to the tube stop position 338, and will contact the fastening ring teeth 163 upon insertion, flexing them towards the stop wall 283. Nevertheless, if the release pusher has been pushed in, the release pusher 170 can then be released, causing the pusher locking member 166 to retreat to a position where the ramp element 230 is resting against the radial mid-wall 272 of the retaining clip member 164. Regardless of insertion method, once the piping element is inserted, the fastening ring teeth 163 then engage the sides of the inserted piping element, thereby resisting any inclination of the inserted piping element to move axially outwardly of the fitting. Additionally, the shoe extensions 257 provide additional support to prevent the fastening ring teeth from failing, as described above. The release pusher 170 may thereafter be removed to prevent any tampering with the fitting arrangement and secure retention of the inserted piping element. Once removed, the release pusher 170 can be re-installed by securing it over the inserted tubing element and snapping it into place with the pusher locking member 166.

The present invention includes tamper-resistant features to dissuade any unscrupulous individual from attempting to tamper with the device and/or internal components. For instance, with the release pusher 170 pulled from the device, it is difficult to engage the pusher locking member 166 so as to push it axially inwardly and release the fastening ring teeth 163 from an inserted piping element. Further, if an individual attempts to pull out an inserted piping element with no release pusher in place, or without applying force to the release pusher 170, the pulling motion will effectively tighten the grip the joint assembly maintains on the inserted element. The retaining clip member 164 can thus provide an increased tensile force on the inserted piping element as the user increases the pulling force. In embodiments of the present invention, the release pusher 170 can break away from its engaged relation with the pusher locking member 166 if sufficient force is applied. In order to properly remove an inserted piping element, the release pusher 170 is secured to the pusher locking member 166, thereby providing an integrated release element, and the pusher is pushed so as to move the ramp element 230 towards the blocker member 195. In this way, the fastening ring teeth 163 are pushed by the tip 171 of the pusher locking member 166 so as to disengage from the inserted piping element, thereby allowing the piping element to be safely removed from the fitting. In embodiments of the present invention, the pusher locking member 166 is slidingly engaged with the retaining clip 164 but does not contact the fitting. Similarly, the neck portion 204 of the release pusher 170 does not contact the fitting when engaged with the pusher locking member 166.

It will be appreciated that any and all dimensions described herein are exemplary and provided as embodiments associated with proper working operation of the present invention. Further, it will be appreciated that, in one embodiment of the present invention, the members of the push connect joint assembly can be formed through hydroforming processes.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A joint packing arrangement, comprising:
   a pusher locking member having a substantially ring-shaped body forming a locking member opening extending therethrough, wherein the locking member body has a radially outer surface and a radially inner surface, with at least one nipple member extending radially into the locking member opening from the radially inner surface; and
   a release pusher having a substantially cylindrical outer wall having an axially outer end, a substantially cylindrical inner wall having an axially outer end, and an axially outer wall connecting the axially outer end of the outer wall and the axially outer end of the inner wall, with the inner wall having a wing extending radially outwardly around the circumference of the inner wall, and wherein the inner wall is further formed so as to include at least one access channel and at least one stop channel, wherein the at least one access channel and the at least one stop channel are engageable with the at least one nipple member of the pusher locking member.

2. The joint packing arrangement of claim 1, wherein the locking member body has an axially inner ledge portion and a rampart portion extending radially outwardly of the radially outer surface.

3. The joint packing arrangement of claim 1 wherein the locking member body has an axially inner retaining lip portion extending radially inwardly into the locking member opening.

4. The joint packing arrangement of claim 3 wherein the release pusher wing is engageable with the locking member inner retaining lip portion.

5. The joint packing arrangement of claim 1 wherein the at least one access channel and the at least one stop channel extend axially along the inner wall.

6. The joint packing arrangement of claim 1 wherein the at least one access channel has an access channel length, the at least one stop channel has a stop channel length, and the access channel length is longer than the stop channel length.

7. The joint packing arrangement of claim 1 wherein the at least one access channel is movably but not lockingly engageable with the at least one nipple member, and wherein the at least one stop channel is lockingly engageable with the at least one nipple member.

8. The joint packing arrangement of claim 2 further including a snap ring member having a substantially ring-shaped body forming an opening extending therethrough and further having an axially outer wall portion for engaging the inner ledge portion and the rampart portion of the locking member body.

9. The joint packing arrangement of claim 8 further including a fastening ring fixedly securable between the snap ring member and the pusher locking member.

10. The joint packing arrangement of claim 9 further including a fitting having a locking compartment, and wherein the pusher locking member, the release pusher inner wall, the snap ring member and the fastening ring are cooperatively secured within the fitting locking compartment such that the release pusher is axially movable and rotatable within the fitting.

11. A method for providing a joint packing arrangement, comprising:
    providing a pusher locking member having a substantially ring-shaped body forming a locking member opening extending therethrough, wherein the locking member body has a radially outer surface and a radially inner surface, with at least one nipple member extending radially into the locking member opening from the radially inner surface; and
    providing a release pusher having a substantially cylindrical outer wall having an axially outer end, a substantially cylindrical inner wall having an axially outer end, and an axially outer wall connecting the axially outer end of the outer wall and the axially outer end of the inner wall, with the inner wall having a wing extending radially outwardly around the circumference of the inner wall, and wherein the inner wall is further formed so as to include at least one access channel and at least one stop channel, wherein the at least one access channel and the at least one stop channel are engageable with the at least one nipple member of the pusher locking member.

12. The method of claim 11, wherein the locking member body has an axially inner ledge portion and a rampart portion extending radially outwardly of the radially outer surface.

13. The method of claim 11 wherein the locking member body has an axially inner retaining lip portion extending radially inwardly into the locking member opening.

14. The method of claim 13 wherein the release pusher wing is engageable with the locking member inner retaining lip portion.

15. The method of claim 11 wherein the at least one access channel and the at least one stop channel extend axially along the inner wall.

16. The method of claim 11 wherein the at least one access channel has an access channel length, the at least one stop channel has a stop channel length, and the access channel length is longer than the stop channel length.

17. The method of claim 11 wherein the at least one access channel is movably but not lockingly engageable with the at least one nipple member, and wherein the at least one stop channel is lockingly engageable with the at least one nipple member.

18. The method of claim 12 including the step of providing a snap ring member having a substantially ring-shaped body forming an opening extending therethrough and further having an axially outer wall portion for engaging the inner ledge portion and the rampart portion of the locking member body.

19. The method of claim 18 further including providing a fastening ring fixedly securable between the snap ring member and the pusher locking member.

20. The method of claim 19 including providing a fitting with a locking compartment, and wherein the pusher locking member, the release pusher inner wall, the snap ring member and the fastening ring are cooperatively secured within the fitting locking compartment such that the release pusher is axially movable and rotatable within the fitting.

21. A push fitting joint packing arrangement, comprising:
    a fitting having an outer wall, and an inner wall, wherein the inner wall defines a locking compartment and a pipe receiving cavity extending along a longitudinal axis of the fitting;
    a pusher locking member maintained within the locking compartment, wherein the pusher locking member comprises a substantially ring-shaped body forming a locking member opening extending therethrough, wherein the locking member body has a radially outer surface and a radially inner surface, with at least one nipple member extending radially into the locking member opening from the radially inner surface; and a release pusher having a substantially cylindrical outer wall having an axially outer end, a substantially cylindrical inner wall having an axially outer end, and an axially outer wall connecting the axially outer end of the outer wall and the axially outer end of the inner wall, wherein the release pusher is secured to the locking member such that the inner wall is axially movable into the cavity, and rotatable about the fitting longitudinal axis, wherein the cylindrical inner wall of the release pusher has a wing extending radially outwardly around the circumference of the inner wall, and wherein the inner wall is further formed so as to include at least one access channel and at least one stop channel, wherein the at least one access channel and the at least one stop channel are engageable with the at least one nipple member of the pusher locking member.

22. The arrangement of claim 21 wherein the cylindrical outer wall and the axially outer wall of the release pusher are maintained outside of the cavity, and wherein the release pusher is axially movable and rotatable within the fitting.

23. The arrangement of claim 21 wherein the wing is engageable with the pusher locking member.

24. A method of enabling a fitting to receive a pipe through push connection, comprising:

providing a fitting having an outer wall, and an inner wall, wherein the inner wall defines a locking compartment and a pipe receiving cavity extending along a longitudinal axis of the fitting;

inserting a pusher locking member into the fitting so as to be maintained within the locking compartment, wherein the pusher locking member comprises a substantially ring-shaped body forming a locking member opening extending therethrough, wherein the locking member body has a radially outer surface and a radially inner surface, with at least one nipple member extending radially into the locking member opening from the radially inner surface; and securing a release pusher to the pusher locking member, the release pusher having a substantially cylindrical outer wall having an axially outer end, a substantially cylindrical inner wall having an axially outer end, and an axially outer wall connecting the axially outer end of the outer wall and the axially outer end of the inner wall, wherein the release pusher is secured to the locking member such that the inner wall is axially movable into the cavity, and rotatable about the fitting longitudinal axis, wherein the cylindrical inner wall of the release pusher has a wing extending radially outwardly around the circumference of the inner wall, and wherein the inner wall is further formed so as to include at least one access channel and at least one stop channel, wherein the at least one access channel and the at least one stop channel are engageable with the at least one nipple member of the pusher locking member.

\* \* \* \* \*